United States Patent [19]

Kormanyos et al.

[11] 4,041,215
[45] Aug. 9, 1977

[54] METHOD FOR FORMING SOLID ELECTROLYTE COMPOSITE

[75] Inventors: Kenneth R. Kormanyos, Rossford; Howard L. McCollister; Paul L. White, both of Toledo, all of Ohio

[73] Assignee: Owens-Illinois, Inc., Toledo, Ohio

[21] Appl. No.: 673,784

[22] Filed: Apr. 5, 1976

[51] Int. Cl.² .............................................. H01M 2/16
[52] U.S. Cl. ................... 429/104; 429/193; 423/600; 264/65
[58] Field of Search ................ 429/104, 193; 423/600; 264/65

[56] References Cited

U.S. PATENT DOCUMENTS

| | | | |
|---|---|---|---|
| 3,655,845 | 4/1972 | Chiku | 264/82 |
| 3,748,178 | 7/1973 | Fally et al. | 429/193 |
| 3,901,733 | 8/1975 | Toy et al. | 429/193 |
| 3,946,102 | 3/1976 | Thomas | 423/600 |

Primary Examiner—Donald L. Walton
Attorney, Agent, or Firm—Richard D. Heberling; Edward J. Holler

[57] ABSTRACT

A solid electrolyte composite is provided which is suitable for use as the separating member between a sodium reservoir source and a sulfur reservoir source in a sodium-sulfur battery; the solid electrolyte composite is manufactured by providing a membrane of a crystalline ionic conductive sodium polyaluminate on a portion of a porous, anhydrous crystalline supporting body consisting of alpha-$Al_2O_3$. The sodium polyaluminate is initially applied in the form of a precursor which is then subsequently heated to form the ionic conductive crystalline sodium polyaluminate membrane.

9 Claims, 1 Drawing Figure

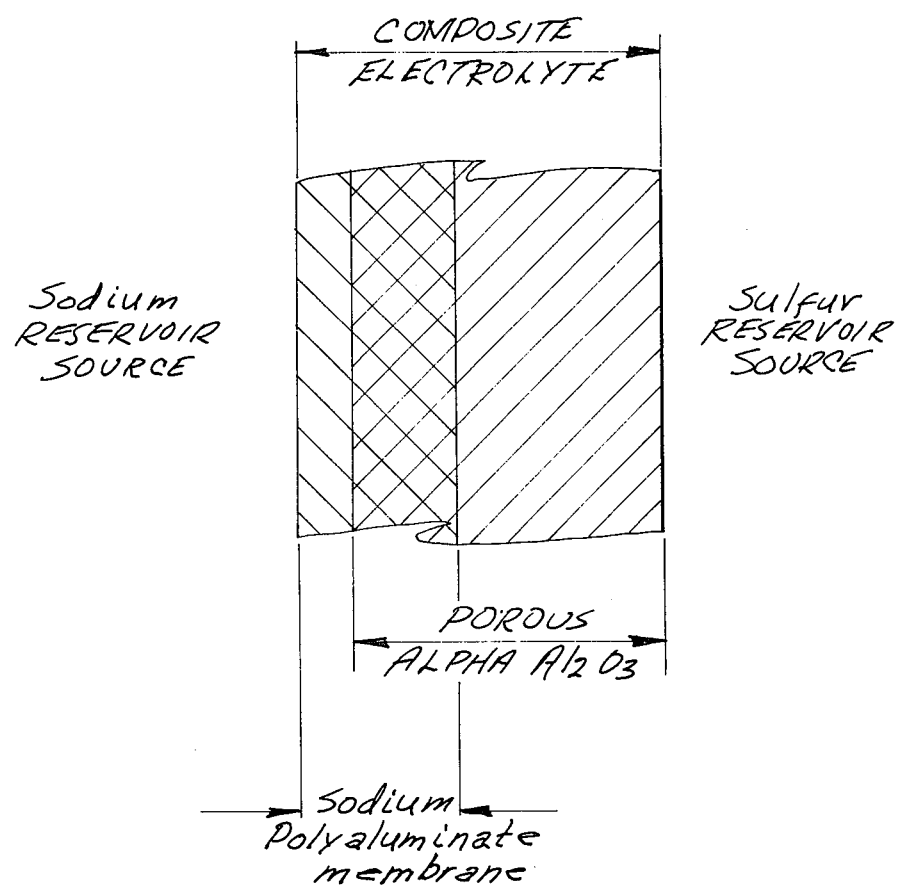

METHOD FOR FORMING SOLID ELECTROLYTE COMPOSITE

THE INVENTION

The present invention is related to solid electrolytes and, more particularly, to methods for forming such solid electrolyte structures. Still more particularly the present invention is directed to sodium polyaluminate electrolyte structures finding utility in sodium sulfur batteries.

Sodium polyaluminate solid electrolytes for use, for example, in sodium-sulfur batteries are well known in the art. For example in U.S. Pat. No. 3,901,733 a thin film solid electrolyte is described of a thin film beta-alumina on a porous beta-alumina substrate. As is well known in the art beta-aluminas are ionic conductive sodium polyaluminates which may generally be represented by the formula $Na_2O.XAl_2O_3$ wherein X generally ranges from about 5 to about 11; generally included in the terminology beta-aluminas, or ionic conductive sodium polyaluminates, are compositions of the formula $ZMO_y.Na_2O.XAl_2O_3$, the latter sometimes being more commonly referred to as beta double prime aluminas, i.e. $B''Al_2O_3$. The $MO_y$ refers to effective stabilizing amounts of metal oxides such as for example lithium oxide, magnesium oxide, and calcium oxide and Z generally corresponds to a molar amount equivalent to from zero, or about 0.5%, by weight up to about 5 % by weight of the total composition. X generally ranges from about 5 to about 11 with Y, of course, being an integer corresponding to the valence of M. In contrast to the ionic conductive sodium polyaluminates anhydrous, crystalline, alpha-$Al_2O_3$ is non-conductive. U.S. Pat. No. 3,900,381 and a related article entitled "The Electrophoretic Forming of Beta-Alumina Ceramic" by R.W. Powers, Journal of the Electrochemical Society, April, 1975, describes electrophoretic methods of forming beta-alumina articles which are useful as solid electrolytes in, for example, sodium-sulfur batteries. That patent, and article, describes the electrophoretic deposition of beta-alumina by first employing a grinding process which involves the use of alpha-alumina as a grinding media and describes the sintering of green beta-alumina ware in alpha-alumina saggers. U.S. Pat. No. 3,499,796 discloses an energy storage device which is a sandwich type structure having a central polycrystalline member; Example 2 of this patent for example discloses a central member which is formed of fusion cast beta-alumina/alpha-alumina eutectic. U.S. Pat. No. 3,404,036 describes an energy conversion device having a solid crystalline electrolyte separator of beta-alumina. The American Ceramic Society Bulletin Vol. 50, No. 7, p.615 discloses contacting beta-alumina structures with beta-alumina. An abstract appearing in *America Ceramic Society Bulletin*, April, 1975, Vol. 54, No. 4, at page 453 indicates the formation of beta-aluminas from alkoxides at temperatures in excess of about 950° C. None of the foregoing patents or articles are believed to describe or recognize the present inventive contribution.

In accordance with the present invention an improved method, and composite produced by that method, is provided for forming a solid electrolyte composite which comprises contacting a surface of a porous, anhydrous, crystalline body consisting of alpha-$Al_2O_3$ with a precursor of an ionic conductive crystalline sodium polyaluminate and heating the contacted surface, which of course will have thereon the precursor, at a temperature and for a time sufficient to convert the precursor to a crystalline ionic conductive membrane of sodium polyaluminate. As used herein the term sodium polyaluminate comprehends a composition of the formula $ZMO_y.Na_2O.XAl_2O_3$ wherein $MO_y$ is a metal oxide which is present in an amount sufficient to thermally stabilize the poly-aluminate composition, Y is an integer dependent upon the valence of M, X is an integer varying between about 5 and 11 and Z is as indicated above. An exemplary sodium polyaluminate is represented by the formula $Na_2O.11Al_2O_3$ with another exemplary polyaluminate being a stabilized specie represented by the formula $.24LiO_2.1Na_2O.6.3Al_2O_3$. Other suitable stabilizing metal oxides include for example calcium oxide and magnesium oxide. On a weight basis, based on the total aluminate composition, the amount of lithium oxide or magnesium oxide or calcium oxide will be from about 0% up to about 5% by weight and more typically, when employed, these stabilizing oxides will be present in an amount between about 0.5% by weight to about 5% by weight. As indicated, the precursor once applied to the surface of the porous, anhydrous, crystalline alpha-$Al_2O_3$ body will be heated at a temperature and for a time sufficient to convert the precursor to a crystalline ionic conductive sodium polyaluminate and to sinter the sodium polyaluminate so as to form a barrier layer, or membrane portion, on the alpha-$Al_2O_3$ body which, for example, is impermeable to the passage of molten sulfur.

The precursor of the ionic conductive crystalline sodium polyaluminate in one embodiment may be the hydrolysis product, with water, of hydrolyzable compounds of the formula $Na(OR)$ and $Al(OR)_3$ and, when it is desired to employ effective stabilizing amounts of other metal oxides, for example stabilizing amounts of lithium oxide or calcium oxide or magnesium oxide, the precursor will optionally also be the hydrolysis product of hydrolyzable compounds of the formula $Li(OR)$, or $Ca(OR)_2$, or $Mg(OR)_2$, or $CaAl(OR)_8$ or $MgAl(OR)_8$ wherein R is an alkyl group of 1 to 5, preferably 2-5, carbon atoms, for example the ethyl radical, or R is a radical of the formula $-CH_2-CH_2O-R'$ wherein R' is an alkyl group of 1 to 4 carbon atoms, for example methyl, ethyl, propyl, and butyl. These compounds are conveniently prepared for example by the reaction of the metal with an alcohol to form an alkoxide, or alcoholate, or by the reaction of the metals with the organic solvents generally available in the art under the Cellosolve designation to form alcoholates which may be viewed as cellosolvates. In the preferred practice, the hydrolysis product of the hydrolyzable compounds indicated above will be formed by hydrolyzing these compounds, with water, in the presence of an organic solvent diluent such as for example alkyl alcohols, e.g. of up to 5 carbon atoms, or the methyl, ethyl, propyl, or butyl Cellosolves with the amount of water generally being at least 1 mole per OR group. Thus, for example if $Na(OR)$ and $Al(OR)_3$ are employed, three moles of water will typically be employed per mole of the aluminum compound and 1 mole of water will typically be employed per mole of the sodium compound. Other suitable organic solvent diluents, for example benzene, will be routinely selected by those skilled in the art. In another embodiment the precursor of the crystalline ionic conductive sodium polyaluminate will be obtained by hydrolyzing the hydrolyzable compounds of the type indicated above and then drying the hydrolysis product to produce an amorphous, particulate, precursor which upon further heating converts to the crystalline, ionic conductive sodium polyaluminate. In an especially suitable technique, the surface of the porous, anhydrous, crystalline body consisting of alpha-$Al_2O_3$ will be contacted with a precursor of an ionic conductive crystalline sodium polyaluminate in which the precursor represents a combination of hydrolyzable compounds indicated above with the precursor being applied in a substantially anhydrous organic solvent solution. In this embodiment, after contacting the surface, the solution will be heated to allow solvent evaporation which, in all likelihood will be somewhat coupled with partial hydrolysis because of air in the environment, and then further heated to convert the precursor to a crystalline ionically conductive sodium polyaluminate membrane which will be impermeable to, for example, molten sulfur.

The anhydrous crystalline porous body consisting of alpha-$Al_2O_3$ is preferably a body having a porosity in the range of about 25% to about 60% and an average pore size diameter in the range of about 0.03 to about 2 microns. Preferably the anhydrous crystalline porous body consisting of alpha-alumina will have a porosity between about 35 to about 60%. The porous alumina body may be in tubular form but it can likewise be in other suitable form such as for example a sheet. Exemplary modes of forming the anhydrous crystalline porous body consisting of alpha-alumina is described in copending application U.S. Ser. No. 605,499 filed Aug. 18, 1975, now abandoned, which is hereby incorporated by reference, said application being a continuation of application U.S. Ser. No. 474,693 filed on May 30, 1974 now abandoned. According to that application crystalline anhydrous bodies of the type contemplated are formed by extrusion of an alumina paste followed by heating, including sintering, to form an anhydrous, crystalline, porous body consisting of alpha-alumina. The paste comprises alumina, a binder, and water and the binder can also include suitable wetting agents. After extrusion, the sheet or tubes are then dried and then heated at an elevated temperature to effect sintering and the formation of the anhydrous crystalline porous body.

The attached drawing in an overly simplified fashion, shows a solid composite sheet electrolyte of the present invention.

As will be seen the porous crystalline alpha-$Al_2O_3$ body carries an ionically conductive crystalline sodium polyaluminate membrane, or layer, with a portion of the membrane being generally diffused into the porous alpha-$Al_2O_3$ body per se and, in exaggerated fashion, includes a thin dense layer of the crystalline sodium polyaluminate at what may be considered the surface of the porous alpha-$Al_2O_3$. While the temperatures and time of heating the precursor and then further heating to effect sintering in the formation of the membrane will vary, generally, it will be found quite suitable to effect the formation of the ionically conductive crystalline sodium polyaluminate from the precursor by heating at temperatures in excess of about 1000° C., quite suitably temperatures in the range of about 1200° to about 1650° C, for times which may vary from several minutes, for example 5 minutes, to as much as 24 hours. Additionally the heating may be effected in air or it may be effected in a controlled isolated environment such as for example by encapsulating with platinum.

While the above is believed to set forth the invention with sufficient particularity to enable those skilled in the art to make and use same, nonetheless, there follows a few detailed examples which are included only for purposes of further exemplification. In these examples an anhydrous, crystalline, porous tubular body consisting of alpha-$Al_2O_3$ and having a porosity of about 50% is employed and is made in accordance with the teachings of U.S. Ser. No. 605,499.

EXAMPLE 1

A precursor of a $1Na_2O.11Al_2O_3$, sodium polyaluminate, was prepared by first reacting about 2.3 grams of sodium metal with about 50 milliliters of ethylene glycol monomethylether (methyl Cellosolve) to form a sodium cellosolvate. To this solution there was then added about 271 grams of aluminum tri (secondary-butoxide) and about 1500 ml of benzene. With vigorous stirring approximately 50 grams of water was then added to hydrolyze the hydrolyzable aluminum and sodium compound and this resulted in the formation of a precipitate. The precipitate was filtered and dried by heating at a temperature of about 500° C. for about 8 hrs. to produce a particulate, amorphous precursor of a crystalline ionic conductive sodium polyaluminate.

The dried hydrolyzed precursor was then heated at a temperature of about 1200° C. in air for about 24 hours and X-ray analysis showed the presence of beta-alumina and alpha-$Al_2O_3$ with the beta-alumina being around 70% and the alpha-alumina around 30%. Similar results were obtained when heating in air at about 1450° C. for about 30 minutes. When heated for about 20 minutes, while being encapsulated in platinum, at about 1585° C. the dried hydrolyzed precursor showed the presence of around 80% of beta-$Al_2O_3$ and around 20% of alpha-$Al_2O_3$.

A crystalline, porous, tubular body consisting of alpha-$Al_2O_3$, having a porosity of about 50%, is then employed to form a composite solid electrolyte as contemplated herein. The dried hydrolyzed precursor is contacted, or applied, to one of the surfaces of the tube, and then the contacted surface is heated, for example in the range of about 1500° to about 1650° C. for about 15 minutes, to form a layer, or membrane, of a crystalline ionic conductive sodium polyaluminate. This structure is ideally suited for use in sodium-sulfur batteries.

EXAMPLE 2

A precursor of a sodium polyaluminate in an organic solvent solution was prepared by reacting about 47.8 grams of aluminum metal with about 500 grams of methyl Cellosolve at reflux for about 2 to 3 hours followed by cooling to about room temperature. To this there was then added about 6.45 grams of sodium metal and about 0.46 grams of lithium metal to produce a solution of a hydrolyzable cellosolvate which is a precursor to a lithia stabilized sodium polyaluminate. This solution of the combined respective $LiO_2$, $Na_2O$ and $Al_2O_3$ providing precursor was then made up to about 800 grams with an additional quantity of methyl Cellosolve and, on a theoretical dry metal oxide basis, the solution contained about 90.3% by weight $Al_2O_3$, about 8.7% by weight $Na_2O$, and about 1.0% by weight of $Li_2O$, and generally corresponds to a precursor of a sodium polyaluminate of the formula $0.24 Li_2O.1Na_2O.6.3Al_2O_3$. This solution of the hydrolyzable precursor was then heated and the table hereinbelow summarizes the heating schedule along with the formed crystalline specie.

| Temperature | Time | Atmosphere | Crystalline Specie Formed |
|---|---|---|---|
| 1200° C. | 24 hr | air | beta-$Al_2O_3$ |
| 1200° C. | 5 min | air | beta-$Al_2O_3$ |
| 1200° C. | 5 min | platinum encapsulated | beta-$Al_2O_3$ |
| 1450° C | 30 min | air | beta-$Al_2O_3$ |
| 1450° C. | 5 min | air | beta-double prime B″$Al_2O_3$ |
| 1585° C. | 20 min. | platinum encapsulated | B″$Al_2O_3$ and trace of beta-$Al_2O_3$ |

A surface of another portion of a tube, like that of Example 1, is contacted with the organic solvent solution of the hydrolyzable precursor indicated immediately above and the contacted surface is then heated to evaporate the solvent and is then further heated at a temperature of about 1500° to about 1650° C. for about 15 minutes so as to produce a crystalline ionically conductive membrane of a sodium polyaluminate which is well adapted for use in a sodium-sulfur battery.

The embodiment of employing the hydrolyzable precursor in an organic solvent solution will be found to be especially suitable and convenient for utilization.

It may be stated that some of the advantages of the present inventive contribution reside in ease of forming various high strength structural configurations, e.g. sheets, squares, tubes, etc., economy of manufacture, lower processing times and temperatures and the provision of a membrane allowing for a high sodium flux, making the composite ideally suited for sodium-sulfur batteries, and a membrane of high homogeneity.

While the above describes the present invention it will, of course, be apparent that modifications are possible which pursuant to the patent statute and laws do not depart from the spirit and scope of the invention.

We claim:

1. A method for forming a solid electrolyte composite having a porous crystalline alpha-$Al_2O_3$ exposed portion and an exposed ionic conductive crystalline sodium polyaluminate membrane portion comprising: contacting a surface of a porous, anhydrous, crystalline body consisting of alpha-$Al_2O_3$ with a precursor which on a dry oxide basis substantially corresponds to a sodium polyaluminate composition and heating said contacted surface at a temperature and for a time sufficient to convert the precursor to a crystalline ionic conductive membrane of sodium polyaluminate and form said composite.

2. The method of claim 1 wherein said precursor on a dry oxide basis consists essentially of about 0 to 5% by weight of $Li_2O$, CaO or MgO, and the balance being $Na_2O$ and $Al_2O_3$.

3. The method of claim 1 wherein the aluminum and sodium moiety of said precursor is obtained from a hydrolyzable compound of Na and a hydrolyzable compound of Al.

4. The method of claim 3, wherein said compounds are of the formula Na(OR) and Al(OR)$_3$ wherein R is an alkyl group of 1-5 carbon atoms, or is a radical of the formula —$CH_2$—$CH_2$—O—R' wherein R' is an alkyl group of 1 to 4 carbon atoms.

5. The method of claim 3 wherein said precursor consists essentially of the hydrolysis product of hydrolyzable compounds of the formula (a) Na(OR), and (b) Al(OR)$_3$ and, optionally, (c) Li(OR), or Ca(OR)$_2$, or Mg(OR)$_2$, or CaAl(OR)$_8$, or MgAl(OR)$_8$ wherein R is an alkyl group of 1-5 carbon atoms, or is a radical of the formula —$CH_2$—$CH_2$—O—R' wherein R' is an alkyl group of 1 to 4 carbon atoms.

6. The method of claim 5 wherein said precursor is an amorphous, particulate material.

7. The method of claim 3 wherein said precursor is a hydrolyzable precursor in an organic solvent solution consisting essentially of the combination of hydrolyzable compounds of the formula (a) Na(OR), and (b) Al(OR)$_3$ and, optionally, (c) Li(OR), or Ca(OR)$_2$, or Mg(OR)$_2$, or CaAl(OR)$_8$ or MgAl(OR)$_8$ wherein R is an alkyl group, or is a radical of the formula —$CH_2$—$CH_2$—O—R' wherein R' is an alkyl group of 1 to 4 carbon atoms.

8. A solid electrolyte composite produced in accordance with the method of claim 3.

9. In a sodium sulfur battery comprising a sodium reservoir source, a sulfur reservoir source and a solid electrolyte composite therebetween, the improvement where said solid electrolyte is a composite produced in accordance with claim 3.

* * * * *